(12) United States Patent
Frericks et al.

(10) Patent No.: US 7,667,642 B1
(45) Date of Patent: Feb. 23, 2010

(54) ACQUISITION, COLLECTION AND PROCESSING SYSTEM FOR CONTINUOUS PRECISION TRACKING OF OBJECTS

(75) Inventors: Jeff E. Frericks, Anaheim Hills, CA (US); Clifford W. Kelley, Rancho Palos Verdes, CA (US)

(73) Assignee: Technaumics, Anaheim Hills, CA (US)

( * ) Notice: Subject to any disclaimer, the term of this patent is extended or adjusted under 35 U.S.C. 154(b) by 369 days.

(21) Appl. No.: 11/464,200

(22) Filed: Aug. 13, 2006

Related U.S. Application Data

(60) Provisional application No. 60/708,296, filed on Aug. 15, 2005.

(51) Int. Cl.
*G01S 5/14* (2006.01)
(52) U.S. Cl. .......................... 342/357.07; 342/357.02; 342/357.08; 342/357.09; 342/357.17; 348/157
(58) Field of Classification Search ............................... 342/357.07–357.09, 357.17, 357.02; 348/157
See application file for complete search history.

(56) References Cited

U.S. PATENT DOCUMENTS

| | | | |
|---|---|---|---|
| 5,225,842 A | 7/1993 | Brown et al. | |
| 5,379,224 A | 1/1995 | Brown et al. | |
| 5,752,218 A | 5/1998 | Harrison et al. | |
| 6,013,007 A | 1/2000 | Root et al. | |
| 6,104,978 A | 8/2000 | Harrison et al. | |
| 6,121,923 A * | 9/2000 | King | 342/357.12 |
| 6,148,262 A | 11/2000 | Fry | |
| 6,226,622 B1 | 5/2001 | Dabbiere | |
| 6,252,545 B1 * | 6/2001 | Da et al. | 342/357.12 |
| 6,463,385 B1 | 10/2002 | Fry | |
| 6,504,483 B1 | 1/2003 | Richards et al. | |
| 6,700,494 B2 | 3/2004 | Dowd | |
| 6,727,846 B1 | 4/2004 | Brown | |
| 6,744,403 B2 * | 6/2004 | Milnes et al. | 342/357.07 |
| 6,934,630 B2 | 8/2005 | Linstrom et al. | |
| 7,062,895 B1 | 6/2006 | Sperie | |
| 2002/0030625 A1 * | 3/2002 | Cavallaro et al. | 342/357.09 |
| 2003/0234738 A1 * | 12/2003 | Orler et al. | 342/357.06 |
| 2004/0006424 A1 * | 1/2004 | Joyce et al. | 342/357.07 |
| 2004/0054471 A1 * | 3/2004 | Bartlett et al. | 342/357.03 |
| 2004/0196183 A1 * | 10/2004 | Roh | 342/357.12 |
| 2005/0137742 A1 * | 6/2005 | Goodman et al. | 700/214 |
| 2006/0055596 A1 * | 3/2006 | Bryant et al. | 342/357.06 |
| 2006/0176216 A1 * | 8/2006 | Hipskind | 342/357.06 |

OTHER PUBLICATIONS

S. Soliman et al., GPS receiver sensitivity enhancement in wireless applications, Digest of the IEEE MTT-S Symposium on Technologies for Wireless Applications, p. 181-186, Feb. 1999.*

* cited by examiner

*Primary Examiner*—Thomas H Tarcza
*Assistant Examiner*—Fred H Mull
(74) *Attorney, Agent, or Firm*—Jerry Turner Sewell

(57) ABSTRACT

A system and method autonomously and precisely track objects moving along a known course. The objects include, for example, racing horses, other racing animals, or racing vehicles. The system and method utilize modern satellite navigation satellite systems, signal processing, radio communications systems and computer processing to acquire and analyze performance data of the moving objects during competitions and during training and practice. The data acquisition is performed continuously at a rate of at least 1 Hz during the competition, training or practice even in the presence of objects which affect the quality of the signals received from the satellite system.

33 Claims, 9 Drawing Sheets

ACQUISITION, COLLECTION AND PROCESSING SYSTEM FOR CONTINUOUS PRECISION TRACKING OF OBJECTS

RELATED APPLICATIONS

The present application claims the benefit of priority under 35 U.S.C. §119(e) to U.S. Provisional Application No. 60/708,296, filed on Aug. 15, 2005.

BACKGROUND OF THE INVENTION

1. Field of the Invention

The present invention is in the field of systems for tracking the movement of objects, and, more particularly, is in the field of tracking a plurality of animals during a race.

2. Description of the Related Art

A solution to track race horses at racetracks has been sought for years. The conventional method of tracking horses is to utilize one or more individuals called "chart callers" who visually track the race horses with binoculars during the race and translate the relative positions and speeds of each race horse to a "chart." This procedure is neither precise nor continuous. Furthermore, the procedure is not 100% repeatable since human error can be introduced.

Various radio frequency (RF) tracking systems have been proposed to improve the current chart calling method. Such systems include, for example, RF identification (RFID), angle of arrival (AOA) systems, time difference of arrival (TDOA) systems, and the like. Such systems are expensive to acquire and operate, require significant modifications to the infrastructures of racetracks, and are complex to maintain and operate. Accordingly, such systems have only been used sporadically and have not achieved widespread acceptance and use. Video-based tracking solutions have also been sought but have been similarly dismissed due to difficulty in ensuring a positive track continuity and track-to-track associations due to tracking issues in foggy conditions and other poor weather conditions. Since horse racing must operate in all weather conditions, the video-based tracking solution, even if used as an aiding device, is not a preferred method for the horse racing industry.

Several new global positioning system (GPS) based solutions (both code phase and carrier phase tracking types) have been proposed and tested in recent years, but the proposed systems have not been used for live racing due to several technical problems, including, for example, difficulty in acquiring and tracking GPS signals in front of buildings and near the grandstand, trees, light structures, fences, and other objects that can block the signal reception at a number of locations along the track. Other technical problems with proposed GPS-based systems included large multipath errors in the starting gate, which caused a loss of reception and required long reacquisition times to regain an accurate tracking solution. The loss of reception caused the loss of lock within the starting gate, thus making the system ineffective as a start timing system and as a system for determining the positions of the racehorses at various points along the racetrack. In addition, the proposed units for mounting on horses were large and heavy and had high battery usage. Accordingly, GPS-based systems are not being used at racetracks.

After more than 10 years of trying to find an accurate and continuous tracking solution with GPS-based systems, RF-based systems, and/or video-based systems, racetracks in the United States and other North American countries still have not implemented a system that meets all requirements for replacing the conventional chart caller system.

SUMMARY OF THE INVENTION

One aspect in accordance with embodiments of the present invention described herein is a GPS-based or other GNSS-based system and methods that acquire, collect, and process data that enables the system and method to continuously track one or more race horses in real time. The system includes a horse (or jockey) mounted tracking device that receives signals from satellites, a communications link, and a centralized workstation that performs specialized computations on the data received by the tracking device to provide precise tracking and timing of the movements of the horse.

The GPS-based horse tracking unit GPS/HTU system described herein has virtually no impact to the racetrack infrastructure. Unlike some attempts to provide electronic monitoring of horse races, the racetrack does not have to be torn up to install sensors at a plurality of locations in order to implement the GPS/HTU system. Furthermore, only one or a few antennas need to be installed to receive the signals transmitted by the tracking units mounted on the horses or jockeys. Accordingly, unlike other attempts to provide electronic monitoring, the GPS/HTU system does not require a plethora of unsightly antennas situated around the racetrack. Furthermore, extensive wiring around the racetrack is not required. Unlike systems having a plurality of sensors, the GPS/HTU system does not require complex calibrations. Accordingly, the GPS/HTU system has a very low installation cost compared to previously considered RF systems. The GPS/HTU system also has a low operational complexity and does not require on-going calibration or engineering in order to maintain the high level of accuracy.

The GPS/HTU system is responsive to GPS or other GNSS signals to provide a continuous tracking system for racetracks during racing events. The tracking system operates even in track environments having blocked or obstructed locations and other features that cause difficult signal acquisition and tracking. The GPS/HTU system incorporates robust code tracking with carrier smoothed GPS and/or other GNSS measurements. Accordingly, the GPS/HTU system provides high availability without blockages or outages at any locations on the racetrack at all tracks within the United States or throughout the world. The high accuracy of the GPS/HTU system accounts for multipath errors and other GPS signal errors. Because of the high sensitivities of the receivers in the horse tracking units, the GPS/HTU system provides a fast time to first fix (TTFF) ability, which includes the ability to track the location of each horse inside the starting gate and continuously after the horse leaves the starting gate. Because the horse tracking units are small and have a low weight, the horse tracking units may be secured to the horses or to the jockeys without affecting the performances of the horses. The units can also be mounted on other moving objects and used to track the objects.

As described herein, the GPS/HTU system can replace the existing chart callers as well as existing track timing systems to provide a more accurate and continuous measurement of multiple race horses during a racing event. As a timing system, the GPS/HTU system is able to determine the start time for each horse, and then monitor the location and velocity of each horse continuously at a rate greater than 1 Hz (e.g., 2-10 times per second) thereafter to provide very accurate and precise tracking at every location on the entire track course. In contrast, conventional timing systems only trip when the first horse leaves the starting gate and when the first horse crosses the finish line and therefore, cannot always determine which horse caused an event. The GPS/HTU system is not affected by false alarms caused by dust, fog, snow, birds and bugs and is not subject to varying qualities of timing due to the wide variety and age of photoelectric sensors currently deployed in the horseracing industry. In view of the economical installation and operation, the GPS/HTU system is able to provide workout performance tracking as well as tracking of real-time race performance.

Among the characteristics that enable the GPS/HTU system to provide the continuous accurate performance described herein is the selection of a receiver having a high signal sensitivity (e.g., ability to acquire and track signals with power levels less than −154 dBm), having a large number of equivalent correlators (e.g., greater than 30,000), and having a high measurement frequency (greater than 1 Hz, and preferably at least 4 Hz). The GPS/HTU system further benefits from the use of adaptive Kalman filtering and centralized error correction processing rather than computing a GPS solution within the tracking unit mounted on each horse or other moving object. In particular, the use of centralized processing with sufficient processing power enables the GPS/HTU system to implement multiple adaptive Kalman filters so that the Kalman filter parameters can be dynamically selected for the signals for each satellite visible to the receiver in each horse tracking unit. The GPS/HTU also uses adaptive measurement rejection, adaptive measurement weighting and adaptive process noise as part of the centralized processing of corrections to apply to the computed pseudorange and delta pseudorange values. Because of variations in the geographies and structures of racetracks and due to the kinematic limitations of a horse race, the GPS/HTU system includes geographic and kinematic aiding corrections, which provide dynamic and positional aiding corrections applied to the measurements to further improve the accuracy of the computed locations of the horses. Due to the ability to track low signal levels, the geographic and kinematic aiding corrections include ray tracing multipath mitigation and corrections for diffraction, refraction and attenuation effects of the satellite signals caused by structures and other objects proximate to a racetrack.

Although the system is described herein with respect to horses on a racetrack, one skilled in the art will appreciate that the system can also be used to track other animate or inanimate objects such as, for example, automobiles, when continuous accurate tracking is required.

An aspect in accordance with the embodiments disclosed herein is a system for tracking and timing a plurality of moving objects over a known course. The system includes a plurality of portable tracking units and a reference station located in a known fixed position with respect to the known course. Each portable tracking unit is mounted on and moves with a respective object traveling over the known course. For example, in certain embodiments, the objects are horses on a racetrack. Each portable tracking unit comprises a global navigation satellite system (GNSS) receiver having a plurality of channels for receiving signals from a plurality of GNSS satellites. Each channel of the receiver comprises a plurality of correlators sufficient to enable the receiver to track a satellite signal when the received signal power level is at least −154 dBm or lower. The receiver periodically generates pseudorange values, delta pseudorange values and signal quality values for each satellite signal being received by the receiver. A mobile communication link is coupled to the receiver and to an antenna. The mobile communication link transmits output signals representing the pseudorange values, delta pseudorange values and signal quality values generated by the receiver. A controller in the portable tracking unit manages the receiver and the mobile communications link. The reference station includes a reference GNSS receiver having a plurality of channels for receiving signals from a plurality of GNSS satellites. The reference GNSS receiver periodically generates pseudorange values, delta pseudorange values and signal quality values for each satellite signal being received by the reference GNSS receiver. The reference station transmits output signals representing the pseudorange values, delta pseudorange values and signal quality values generated by the reference GNSS receiver. A stationary communication link receives output signals from the plurality of the portable tracking units and from the reference station. A central processing system receives periodic signals from the stationary communication link representing the pseudorange values, delta pseudorange values and signal quality values for each satellite signal received by the receiver in each portable tracking unit and for each satellite signal received by the reference GNSS receiver. The central processing system is responsive to the signals from each portable tracking unit and the signals from the reference GNSS receiver to compute an individual GNSS solution for each portable tracking unit when the GNSS processing system receives the periodic signals. A system controller provides position and movement data for each portable tracking unit based on the GNSS solution for the tracking unit.

Preferably, each channel of the GNSS receiver in each tracking unit includes code tracking, carrier smoothed tracking loops. Preferably, the plurality of correlators in each GNSS receiver in each tracking unit comprises the equivalent of at least 30,000 correlators.

Preferably, the GNSS receiver in each portable tracking unit generates pseudorange values, delta pseudorange values and signal quality values for each satellite signal being received by the GNSS receiver at least once per second. More preferably, the GNSS receiver in each portable tracking unit generates pseudorange values, delta pseudorange values and signal quality values for each satellite signal being received by the GNSS receiver at least 2-10 times per second. In an exemplary embodiment of the system, the GNSS receiver in each portable tracking unit generates pseudorange values, delta pseudorange values and signal quality values for each satellite signal being received by the GNSS receiver approximately 4 times per second.

Another aspect in accordance with the embodiments disclosed herein is a method for operating a system for tracking moving objects in a competition over a known course. For example, in certain embodiments, the moving objects are horses on a racetrack. The method comprises placing a portable tracking device on each object in the competition. Each tracking device is positioned on the respective object to receive signals from a plurality of satellites in a global navigation satellite system (GNSS). The method also comprises collecting GNSS pseudorange and delta pseudorange measurements and satellite almanac and ephemeris data from a reference station in a known, fixed location. Each portable tracking device is initialized with current satellite almanac and ephemeris data collected from the reference station to enable each portable tracking device to acquire and track signals from the plurality of GNSS satellites for a predetermined time before the beginning of the competition. The method further comprises transmitting GNSS pseudorange and delta pseudorange measurements and signal quality information for each satellite being tracked by each portable tracking device to a central location before and during the competition, and also transmitting GNSS pseudorange and delta pseudorange measurements and signal quality information for each satellite being tracked by the reference station to the central location before and during the competition, The method periodically determines an actual position of each object based on the GNSS pseudorange and delta pseudorange measurements and signal quality information received from the portable tracking unit on the object and based on the GNSS pseudorange and delta pseudorange measurements and signal quality information received from the reference station until the conclusion of the competition.

Preferably, the method further comprises analyzing the measurements and signal quality information received from each portable tracking device to determine whether the portable tracking device is operating properly. For example, in one embodiment, the method verifies that the portable tracking devices on all objects in a competition are operating properly before starting the competition.

Preferably, the method displays the actual position information for each object in real time during the competition. The method also advantageously displays the relative position of each object with respect to other objects in the competition during the competition. The actual position information may be displayed in a track coordinate system that includes at least a distance along the known course from the beginning of the competition and a distance with respect to a lateral boundary of the known course. The actual position may also be displayed in a Cartesian coordinate system referenced to a selected origin.

Preferably, the method derives and displays a set of competition metrics for each object in the competition. For example, the set of competition metrics advantageously comprises an identification of the object as a lead object if the object is the lead object or is sharing the lead with another object. If the object is not the lead object, the derived and displayed track metrics include a relative distance of the object behind the lead object in the competition, a relative speed of the object with respect to the lead object, an amount of time that the object lags behind the lead object, a change in the relative distance between the object and the lead object, and an acceleration of the object with respect to at least the lead object. In certain embodiments, the method transfers the actual position information for each object during the competition to a central database for storage. For example, the actual position information stored for each object includes a start time for the competition, at least one time relative to the start time when the object passes at least one predetermined location in the known course, locations of the object at predetermined timing intervals during the competition, and an ending time when the object completes the competition.

The method also advantageously provides the position information for each object as current information to a plurality of users via a radio network. In certain embodiments, the method analyzes the position information for each object to determine current performance information for the object and compares the current performance information to historical performance information for the object. Preferably, the method simulates the expected performances for the objects in a competition based on previous performance information for the objects determined from the position data collected during other competitions. The method also advantageously simulates the performance of at least one object in a previous competition based at least in part on position information collected in the current competition to analyze changes in the performance of the object.

In certain embodiments, the method also provides position data for each object in a competition to a plurality of users during the competition to enable the users to determine the relative positions of the objects at predetermined locations along the known course competition in addition to the relative positions of the objects at the end of the known course. In certain embodiments, the method enables the plurality of users to enter additional wagers on the relative positions of the objects at the end of the competition based on relative positions of objects at predetermined locations towards the beginning of the competition.

Another aspect in accordance with the embodiments disclosed herein is a method for acquiring, collecting, processing, and tracking at least one object moving along a predetermined course. The method comprise receiving global navigation satellite system (GNSS) signals from a plurality of satellites in view of a moving receiver mounted on the at least one moving object while the object moves from a starting location to an ending location along the predetermined course. The method periodically generates GNSS data responsive to the GNSS signals received by the moving receiver. The method also includes receiving GNSS signals from a plurality of satellites by a reference receiver in a known location, and periodically generating GNSS data responsive to the GNSS signals received by the reference receiver. The method transmits GNSS data from the moving receiver to a processing station, and transmits the GNSS data from the reference receiver to the processing station. The method processes the GNSS data from the moving receiver to calculate an estimated line of sight distance from the moving receiver to each of the satellites in view of the moving receiver. The method computes differential corrections for each of the calculated line of sight distances using the GNSS data from the reference receiver and applies the differential corrections to the calculated line of sight distances to generate a corrected line of sight distance to each of the satellites in view of the moving receiver. The method applies a Kalman filter to each of the corrected line of sight distances to adaptively reject unacceptable measurements and to pass acceptable measurements. The method generates an updated line of sight distance from the moving receiver to each satellite for which the respective Kalman filter passes an acceptable measurement, and calculates a location of the moving receiver based on the updated line of sight distances.

Preferably, the GNSS data generated by the moving receiver for each satellite in view of the moving receiver comprises pseudorange values, delta pseudorange values, carrier tracking loop status information, and carrier to noise ratios. Similarly, the GNSS data generated by the reference receiver for each satellite in view of the reference receiver comprises pseudorange values, delta pseudorange values, carrier tracking loop status information, and carrier to noise ratios.

In accordance with preferred aspects of this method, the application of the Kalman filter to each corrected line of sight distance to each satellite comprises computing an optimal Kalman filter gain responsive to the carrier signal to noise ratio data for the signal from the respective satellite, the estimated elevation to the respective satellite, and carrier loop status information; computing a state vector that employs estimates of the position, velocity and acceleration of the moving object, a receiver clock offset with respect to the GNSS system clock, and a clock frequency error for the signal from the respective satellite; updating a Kalman filter state vector responsive to a current pseudorange value and a current delta pseudorange value from the respective satellite and responsive to geographic aiding data representing signal affecting characteristics of the predetermined course; updating a covariance matrix with longitudinal course and lateral course components that adaptively change based on the a velocity vector of the moving object and a position of the moving object on the predetermined course; estimating the position, velocity, and acceleration of the moving object along with virtual timing reference lines to compute a time at which the moving object crosses the timing reference lines; estimating a position, velocity and acceleration of the moving object and a covariance to project to the next measurement time when the process repeats; and repeating the foregoing steps for as new data are received periodically.

Preferably, this method further comprises periodically receiving satellite clock and ephemeris data by the reference receiver, and transmitting the satellite clock and ephemeris data to the moving receiver to initialize the moving receiver.

BRIEF DESCRIPTIONS OF THE DRAWINGS

Certain embodiments in accordance with the present invention are described below in connection with the accompanying drawing figures in which.

Figure 1:
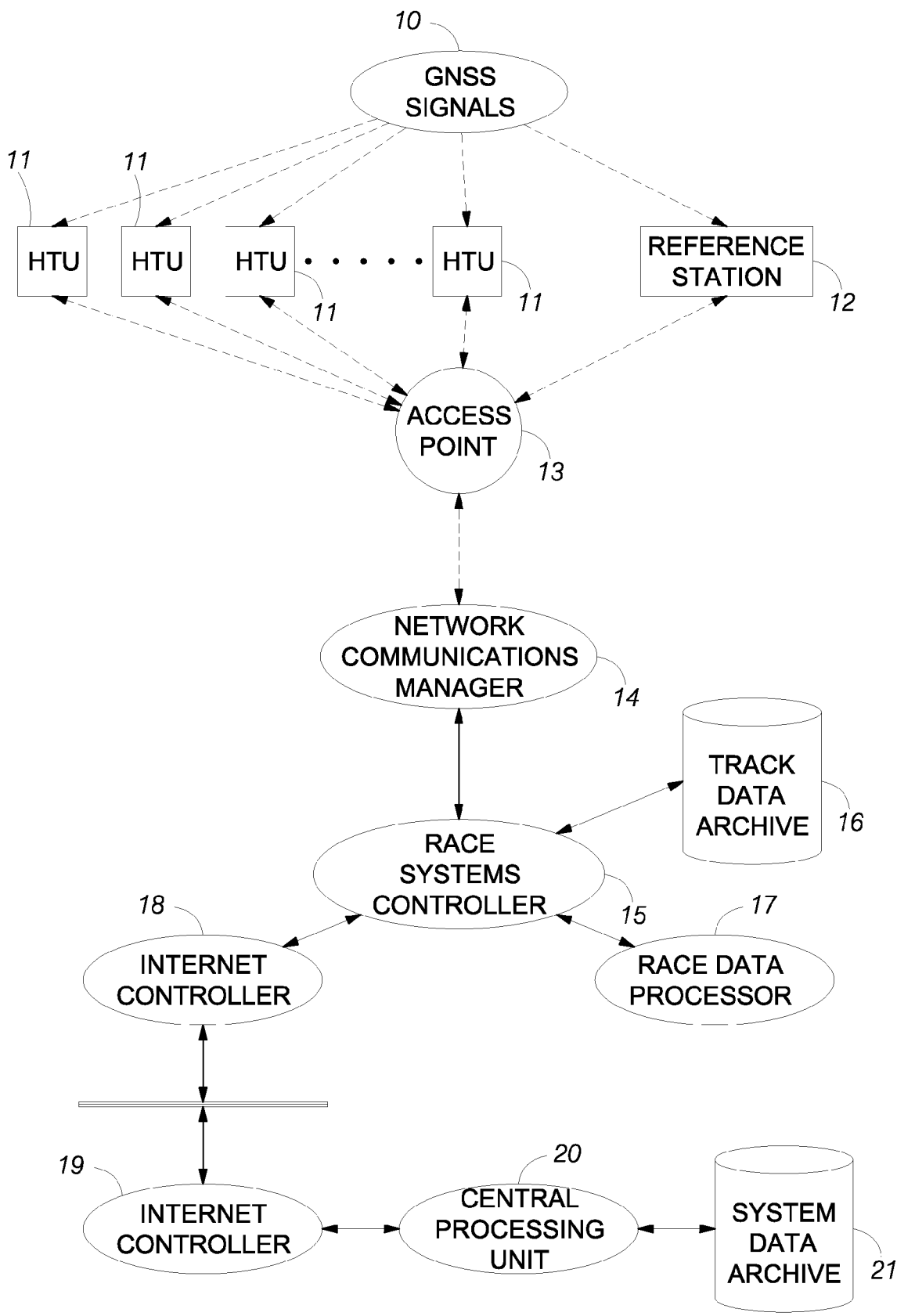
FIG. 1 illustrates a block diagram of the overall system.
Figure 3A:
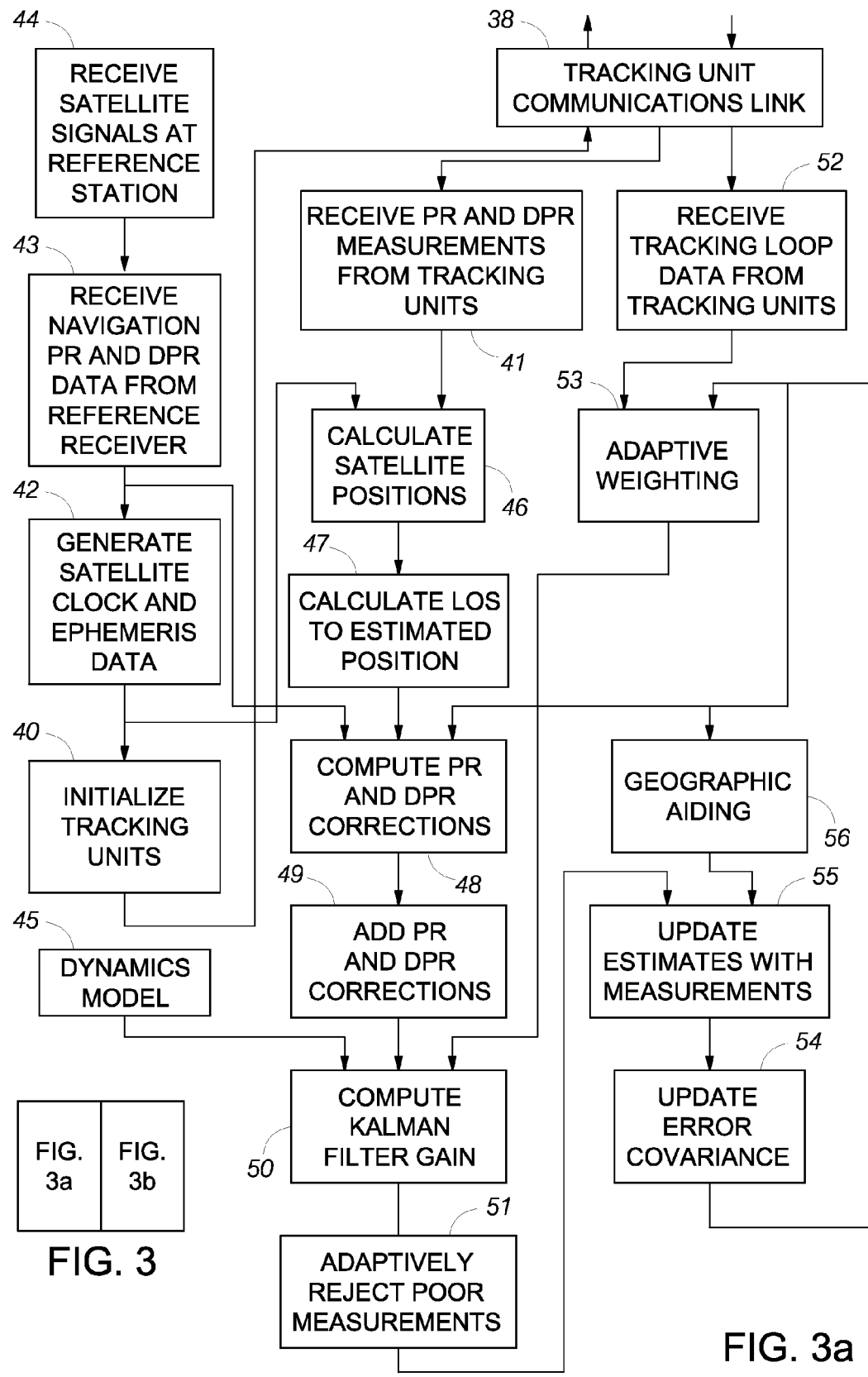
Figure 3B:
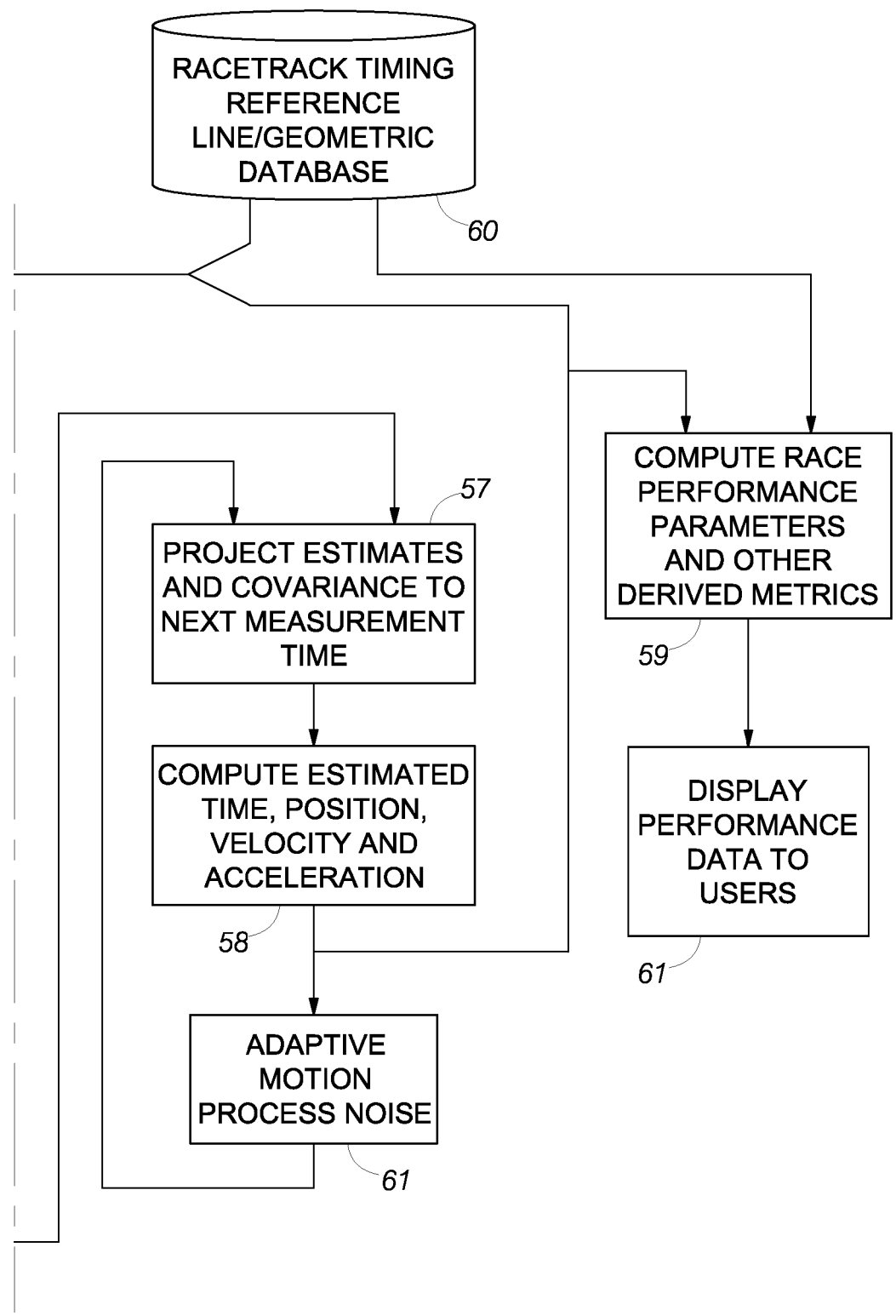
Figure 4:
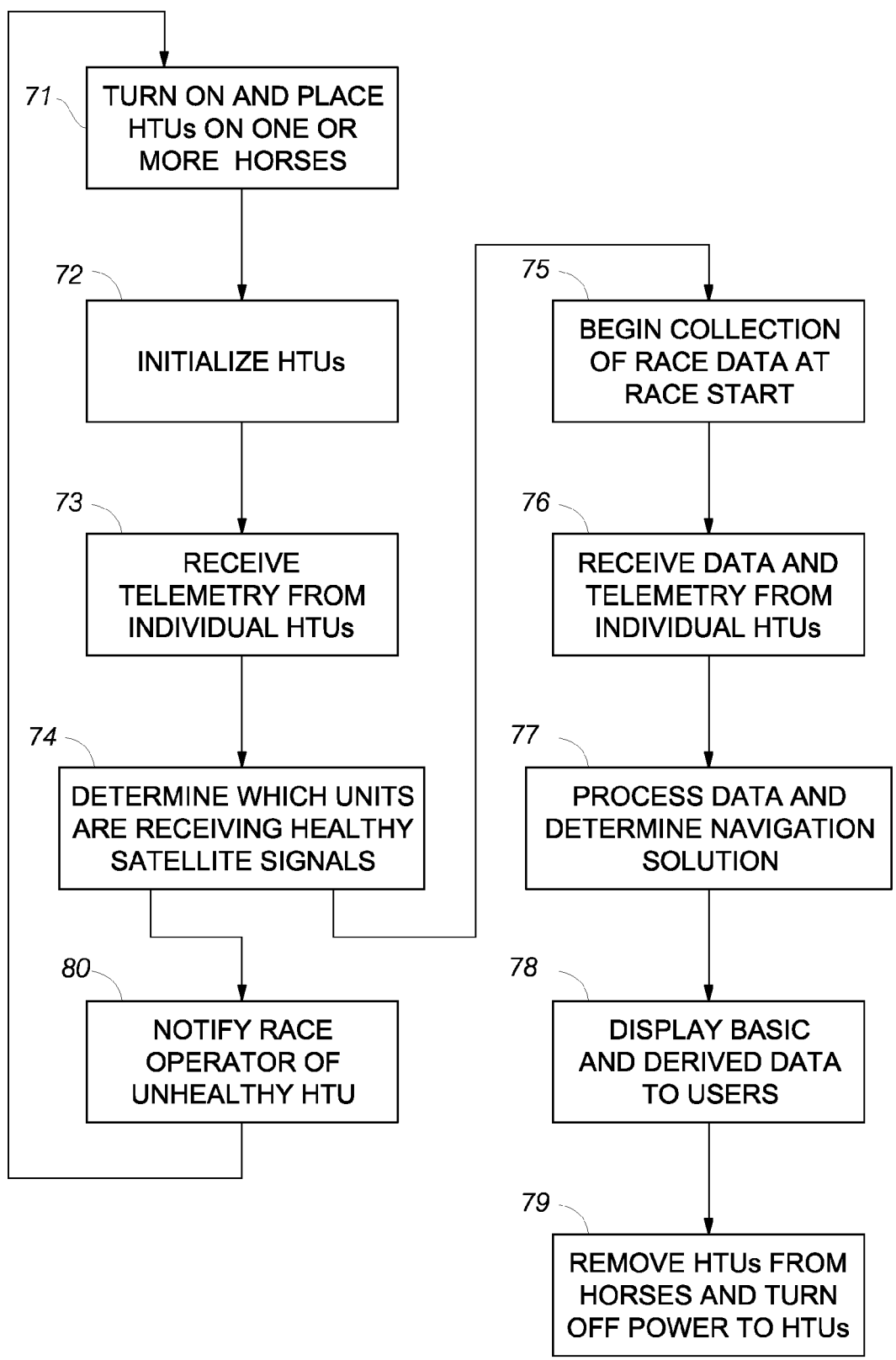
Figure 5:
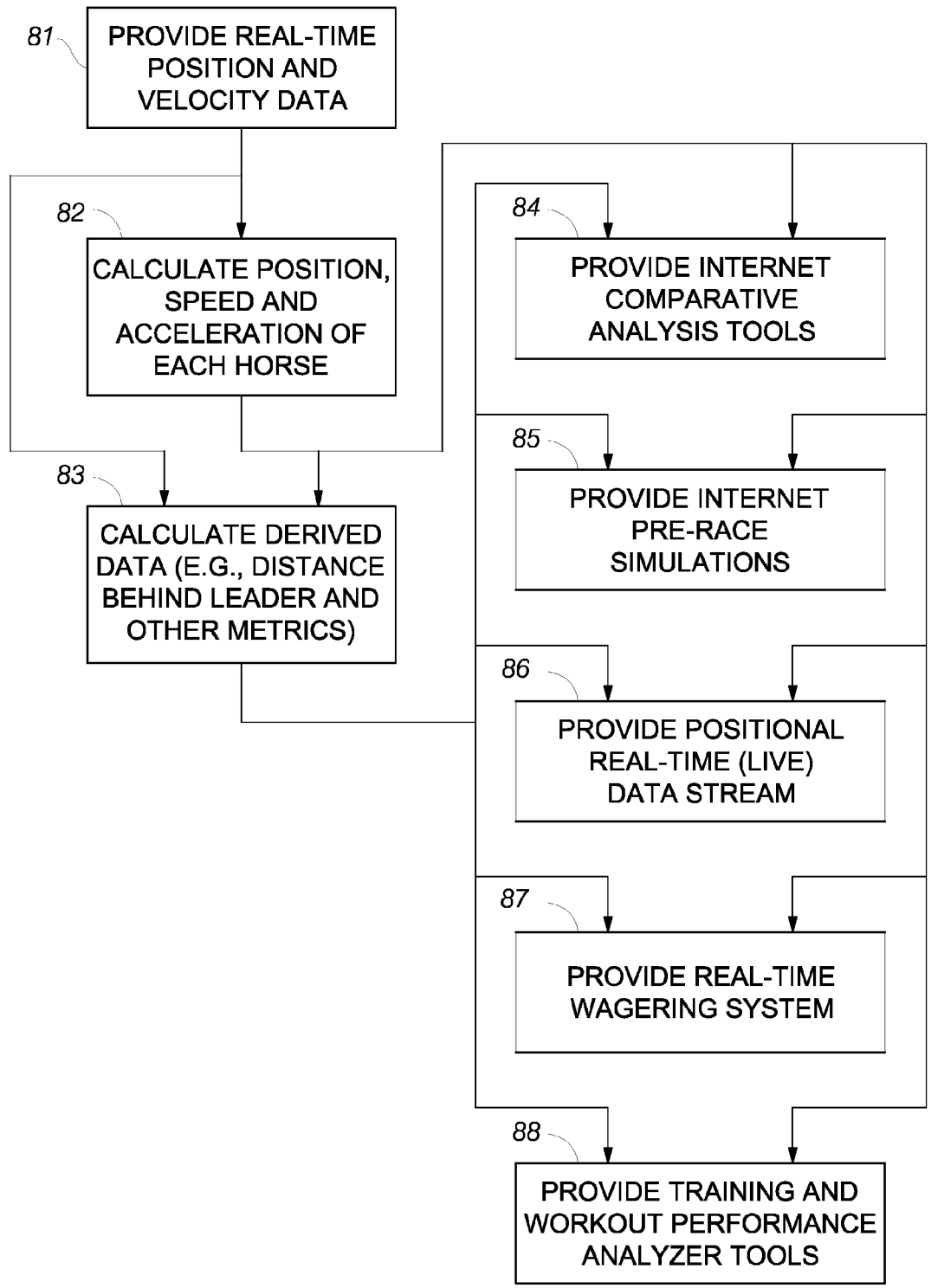
Figure 6:
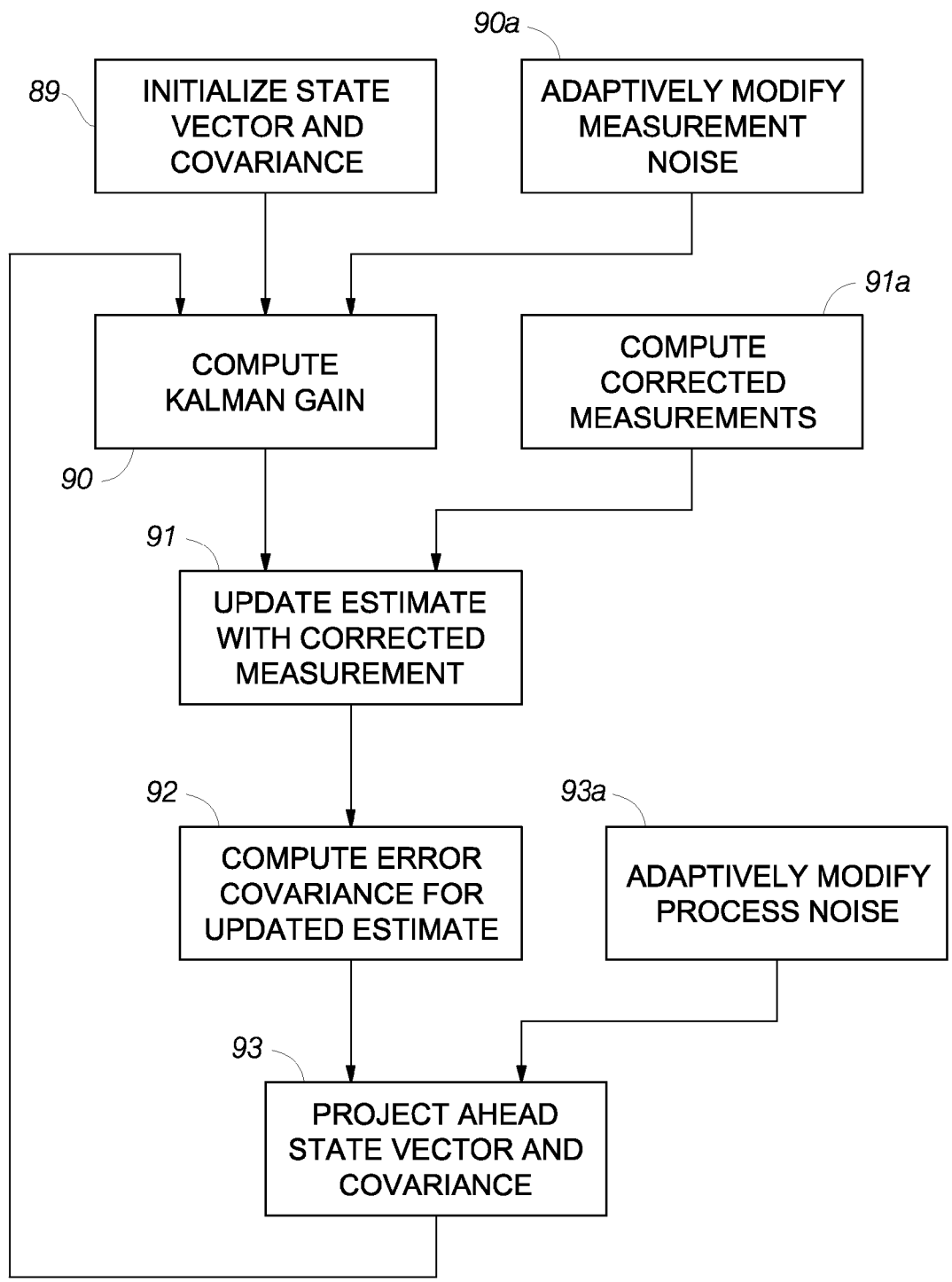
Figure 7:
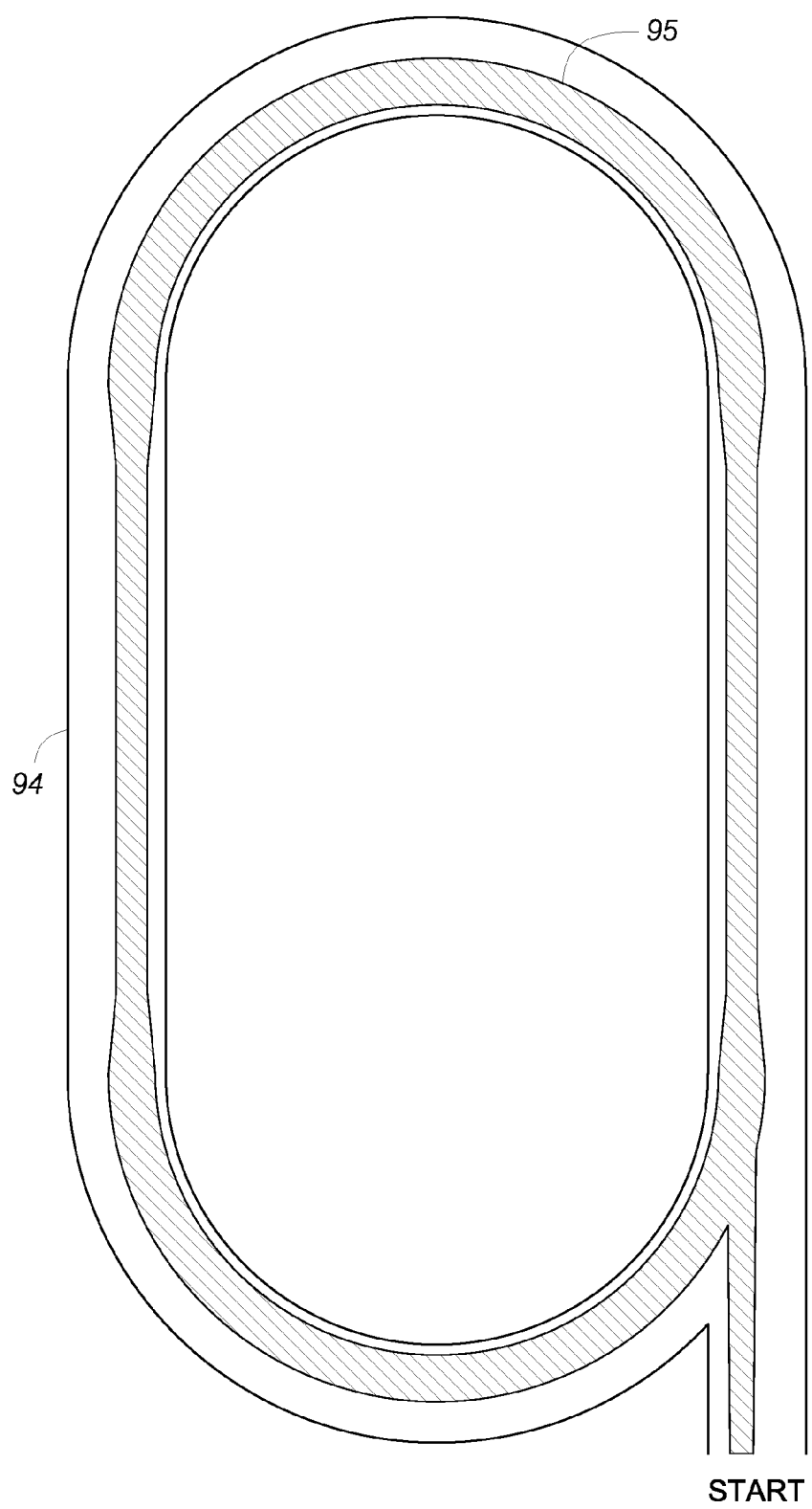
Figure 8:
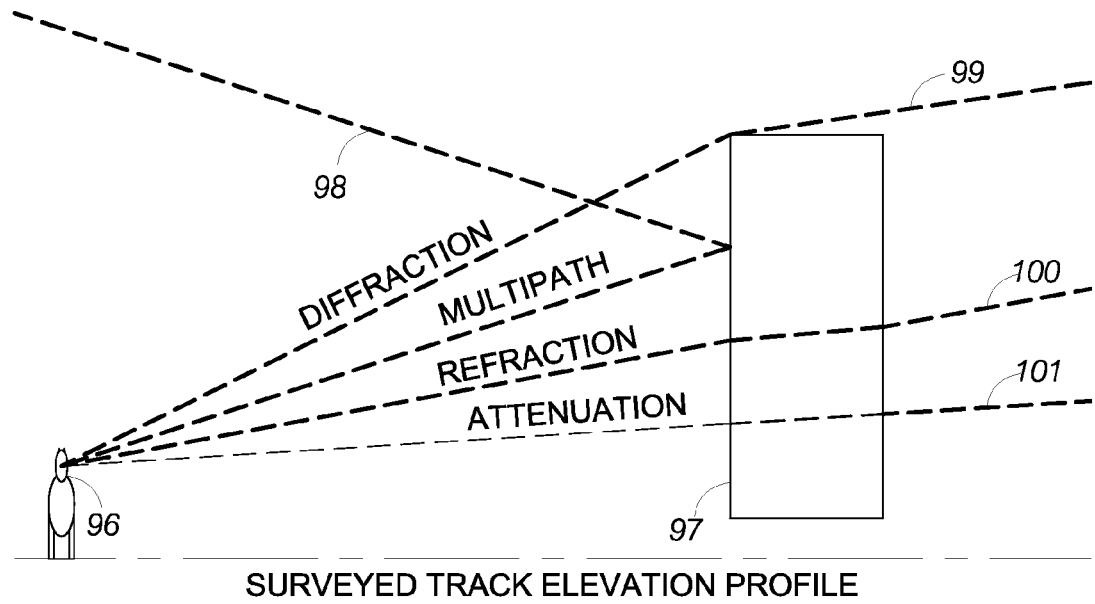

FIG. 3, comprising FIGS. 3a and 3b, illustrates a flow diagram of the continuous acquisition, collection and tracking process performed by the system of FIG. 1;

FIG. 4 illustrates a flow diagram of the operation of the system of FIG. 1 during a race;

FIG. 5 illustrates a flow diagram showing the acquisition and use of data provided by the system of FIG. 1 before, during and after a race;

FIG. 6 illustrates a diagram of the Kalman filter process utilized in the system of FIG. 1;

FIG. 7 illustrates a pictorial diagram of the adaptive process noise versus location and time at an exemplary race course; and FIG. 8 illustrates the effects of multipath signals, signal diffraction, signal refraction and signal attenuation caused by structures proximate the race course pictorially illustrated in FIG. 7.

DETAILED DESCRIPTIONS OF PREFERRED EMBODIMENTS

The following description and the accompanying drawings illustrate an exemplary embodiment of a system for tracking moving objects around a race course. The description and drawings are intended to be illustrative of the inventions defined in the appended claims.

FIG. 1 represents a system level diagram for a system in accordance with aspects of the present invention. The system comprises a plurality of horse tracking units (HTUs) 11, which are mounted on the racehorses or riders in a particular race. For example, each HTU 11 may be advantageously mounted on a belt or on the racing vest of a rider (jockey). Alternatively, an HTU 11 may be advantageously mounted to rear of the saddle or on another location on a racehorse. Each HTU 11 is uniquely identified and is associated with a particular racehorse or jockey in each race in which the system is used.

As discussed in more detail below in connection with FIG. 2, each HTU 11 receives a plurality of Global Navigation Satellite System (GNSS) navigational signals 10. The GNSS signals 10 that may be utilized in the system of FIG. 1 advantageously comprise signals provided by GPS, Globanaya Navigatsionnay Sputnikovaya Sistema (GLONASS), European GPS (Galileo), Wide Area Augmentation System (WAAS), European Geostationary Navigation Overlay Systems (EGNOS), GPS and/or other satellite or ranging systems. The following embodiments are described with respect to GPS signals, but it should be understood that the system can be readily adapted to be used with other satellite signals or ranging signals.

Each HTU 11 transmits a plurality of signals responsive to the received GNSS signals 10 to an access point 13 using conventional collision avoidance techniques to enable the HTUs 11 to share the same communication frequencies to and from the access point 13. The signals transmitted to the access point from each HTU 11 include pseudorange, delta pseudorange and signal strength information for each of a plurality of satellites from which the respective HTU 11 receives satisfactory signals. A stationary reference station 12 also receives the GNSS signals 10 from a plurality of satellites and transmits the corresponding pseudorange, delta pseudorange and signal strength information to the access point 13 for each satellite.

The access point 13 relays the data in the received GNSS signals 10 received by each HTU 11 and the reference station 12 to a network communications manager 14 via a wireless data link (e.g., WiFi). In the illustrated embodiment, the access point 13 simply relays the raw GPS measurements from the HTUs 11 and the reference station 12 to the network communications manager 14 without modifying the data.

The network communications manager 14 manages the data traffic flow from all units on the network. For example, the network communication manager 14 passes the data received from the access point 13 on to the race system controller 15. The race systems controller 15 stores the data in a track data archive (data storage unit) 16. A race data processor 17, which may be part of the race systems controller 15 or which may be a separate processing system, processes the data stored in the track data archive 17 by combining the data from each HTU 11 with data collected from the reference station 12. In particular, the race data processor 17 uses the pseudorange data, the delta pseudorange data, and the signal strength data from each HTU 11 and from the reference station 12 to accurately determine the precise location of each HTU 11 continually throughout the duration of a race. As used herein, "continually" means periodically at a predetermined sample rate (e.g., 2-10 times per second) for each horse. For example, in a preferred embodiment, the location of each horse is determined 4 times per second, corresponding to a sample rate of 4 Hz. In contrast, to the present system, a chart caller or one of the earlier attempts at automating horse location systems may have only determined the relative positions of the horses at certain locations on the racetrack (e.g., at each eighth-mile or quarter-mile marker).

The race systems controller 15 further processes and stores the data for later transfer to a central processing unit 20 and to a storage archive 21. The system advantageously includes internet (network) controllers 18 and 19 to maintain the traffic flow and to provide necessary data integrity functions. The race systems controller 15 also manages the health, status, and operation of the overall individual system at each racetrack.

Figure 2:
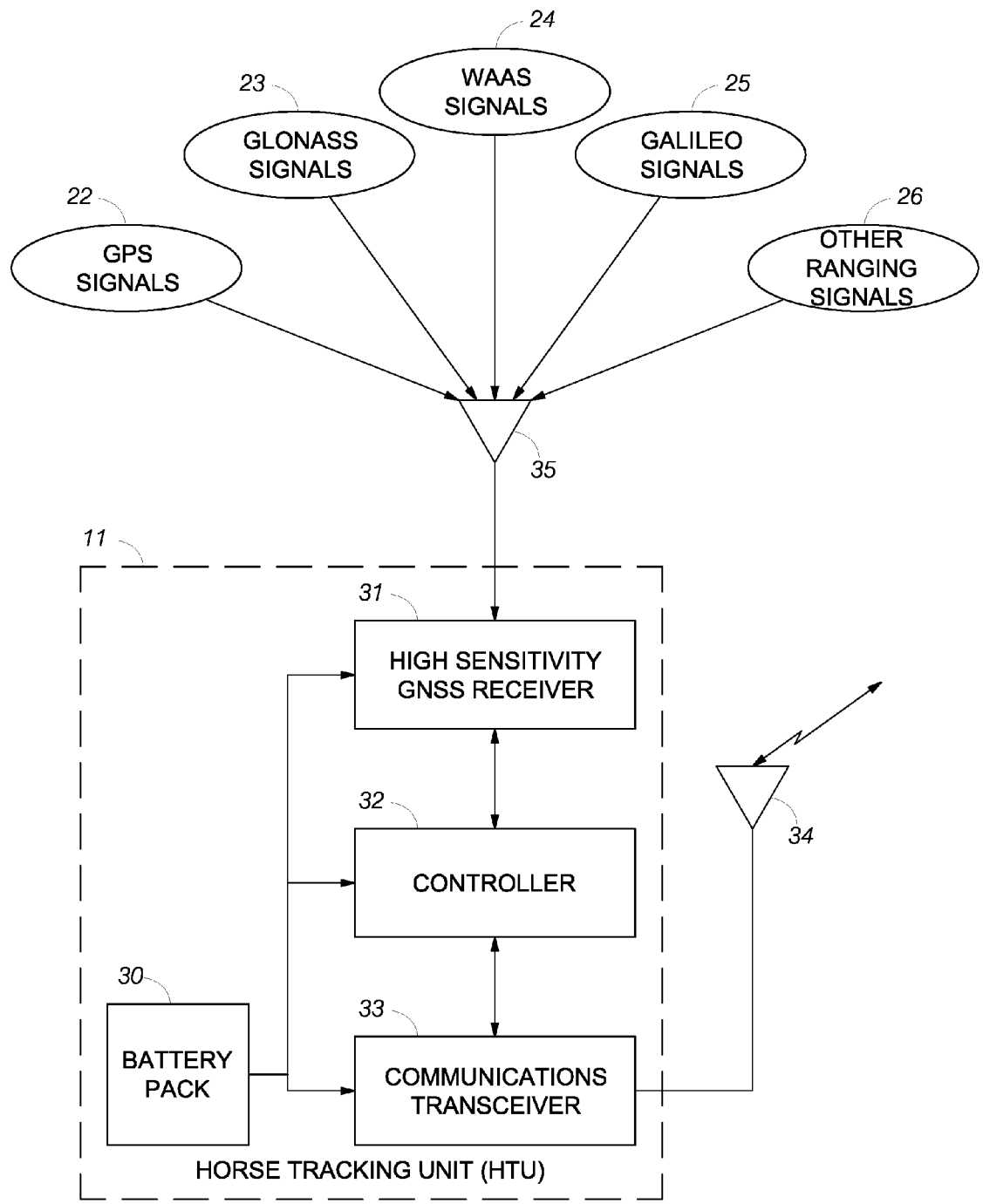
FIG. 2 illustrates a block diagram of an embodiment of one of the horse tracking units of FIG. 1.

FIG. 2 illustrates additional details of each HTU 11. The HTU 11 comprises a high sensitivity, massive correlator GNSS (e.g., GPS) receiver 31 having an antenna 35. As discussed above, the GNSS receiver 31 can be configured in a particular system to use signals from a constellation of GPS satellites 22 or a constellation of GLONASS satellites 23. The receiver 31 may also use the augmentation provided by the WAAS satellites 24. The receiver 31 may also be adapted to utilize signals from the European Union Galileo satellites 25 when the Galileo system is operational or other ranging signals from other sources 26.

Unlike a conventional GNSS receiver that includes processing algorithms that compute the location of the receiver based on the timing of the signals received from a plurality of satellites, the GNSS receiver 31 in the HTU 11 streams out raw pseudorange and raw delta pseudorange rate data to a controller 32 located in the HTU 11. The controller 32 advantageously comprises a microcontroller, a field programmable logic array (FPGA), or another suitable programmable or hardware control device. The controller 32 manages the input and output (I/O) from and to a wireless communication transceiver 33, which is coupled to an antenna 34. The access point 13 (FIG. 1) includes an antenna (not shown) that enables the access point 13 to communicate with the HTU 11 via the antenna 34. Although the receiver 31, the controller 32 and the wireless communication receiver 33 are shown as three separate devices in FIG. 2, it should be understood that the circuits and functions of two or more of the devices can be combined such that the functions of the three devices can be combined into one or two devices.

The high sensitivity receiver 31 is a receiver that is capable of acquiring a signal from a satellite at a received power level down to at least −154 dBm (e.g., down to −154 dBm or lower) and to continue to track a signal having a downlink carrier to noise ratio (C/No) as low as 22 dB-Hz. The receiver 31 includes massive correlators (e.g., greater than the equivalent of 30,000 correlators) to enable the receiver to receive GNSS signals from satellites on at least 12 channels. The massive correlators in the receiver 31 provide the necessary tracking sensitivity to ensure continuous tracking of a satellite even in the proximity of foliage, light structures, grandstands, the starting gate and other structures. Such structures have caused the use of the satellite navigation at racetracks to be infeasible in the past. In the preferred embodiment, the GNSS receiver 31 includes code tracking, carrier smoothed tracking loops with long integration durations of at least 20 milliseconds. The receiver 31 is able to track up to 12 visible satellites. The receiver 31 generates pseudorange values and delta pseudorange values for each visible satellite. The receiver 31 also generates carrier tracking loop status information (e.g., C/No) and the like) for each visible satellite. The receiver 31 also generates a value representing the measured carrier to noise ratio (C/No) for each visible satellite. Because of the high sensitivity of the receiver 31, a satellite remains visible even when the satellite is at a low elevation with respect to the HTU 11 and even when the signal from satellite is affected by obstacles in the signal path from the satellite to the HTU 11. An example of a high sensitivity, massive correlator receiver 31 having the described capabilities is a SiRFstar III chip set commercially available from SiRF Technology, Inc., of San Jose, Calif. The SiRFstar III chip set provides the equivalent of more than 200,000 correlators and updates the GPS measurement data at rates up to 10 times per second.

The communications transceiver 33 for each HTU 11 transmits data to and receives data from the access point 13 (FIG. 1) at a high data rate (e.g., a data rate greater than 57,000 bits per second) at a radiated power of less than approximately 150 milliwatts. In particular, the communications transceiver 33 transmits data representing the pseudorange values and delta pseudorange values, the carrier and code loop status information, and the measured carrier to noise ratios generated by the receiver 31 for each visible satellite.

The HTU 11 utilizes power management techniques to reduce energy drain of the receiver 31, the communications link 33 and the other electronics, to reduce the energy storage requirements of the battery pack 30. The HTU 11, including the receiver 31, the battery pack 30, the controller 33, the communications transceiver 33, and the transceiver antenna 34, is light weight (e.g., weighs less than 100 grams) and has a small size (e.g., has a volume less than 200 cubic centimeters. Accordingly, the HTU 11 is sufficiently portable for use on a race horse.

The bidirectional communication between the access point 13 and the HTU 11 allows the race systems controller 15 to interrogate the HTU 11 to determine health status and the operating condition or mode of the HTU 11 before a race is started and during a race.

FIG. 3 (comprising FIGS. 3a and 3b) illustrates the processing methodology used to process the satellite ranging signals relayed to the access point 13 from the HTUs 11 and to determine an accurate continuous three-dimensional navigational and timing solution for the horse racing industry. Again, as used herein, "continuous" means that the HTUs 11 provide the satellite ranging signals to the positional processing system at a predetermined rate (e.g., 2-10 times per second) throughout the duration of the race without interruption or loss of navigation fix. In one particular embodiment, the satellite ranging signals are sampled and transferred at a rate of 4 Hz. Although shown as one process, it should be understood that the process shown in FIG. 3 is performed on the data received by each HTU 11 from each "visible" satellite. By offloading the complex processing of the locations of the HTUs 11 from the HTUs to a central location, the complexity of each HTU 11 is significantly reduced, which reduces the size, weight and power requirements of each HTU 11.

In FIG. 3, a communications link 39 represents the RF data path from the HTUs 11 to the access point 13 and from the access point 13 to the HTUs 11. As discussed above, each HTU 11 provides raw satellite signal ranging measurement data (pseudorange and delta pseudorange) for each satellite having a signal with sufficient strength to be tracked by the receiver within the HTU 11. The pseudorange (PR) and delta pseudorange (DPR) measurement data are provided to a processing function 41.

Each HTU 11 also provides data on the tracking loop status for each satellite being tracked by the receiver of the HTU 11. The tracking loop status data from each HTU 11 are provided to a processing function 52, which provides the tracking loop data to an adaptive weighting function 53. The output of the adaptive weighting function 53 for each satellite for each HTU 11 is responsive to the tracking loop data for each satellite and is also responsive to the data specifically related to a race track, to the current time, and the estimated position, velocity and acceleration of the horse associated with the HTU 11.

The process shown in FIG. 3 is able to produce highly accurate location information on a real-time basis by the adaptive weighting of the tracking loop data, by central processing of the data from all of the HTUs 11, and by kinematic adjustment of Kalman filters based on track site specific kinematics and based on kinematics specific to a particular horse race (e.g., track selection (at locations having two or more tracks), race starting point, and the like). Additionally, Doppler measurements of the individual signals are advantageously used to adjust the Kalman filter in low satellite level conditions (e.g., a low number of visible or trackable satellites) to aid the tracking solution for short periods of interruption should they occur. The Doppler measurements are very accurate and can be used to calculate positional or speed data with a minimum dilution of precision since the variations in the kinematics of the race horses are predictable.

The kinematic data are prepared for processing by using the pseudorange and delta pseudorange date to calculate the satellite positions in a function 46 and then to compute the line of sight (LOS) distance from each satellite to the estimated position in a function 47. High accuracy is achieved by using the reference receiver location 44. The reference receiver 12 (FIG. 1) provides pseudorange data and delta pseudorange data (represented by a block 43). The pseudorange data and delta pseudorange data from the reference receiver are provided to a process 48. The process 48 also receives the line of sight distance from the function 47 along with other corrections based on the estimated position of the unit from a process 58 information from a database 60 of diffraction, refraction and multipath factors. The process 48 computes differential GPS corrections, which are added to the calculated satellite positions in a process 49.

The corrected calculated satellite positions from the process 49 along with the adaptive weighting from the function 53 and information from a dynamics model 45 are used to compute a Kalman filter gain in a process 50. A process 51 is responsive to the output of the process 50. In order to maintain the integrity of the data, the process 51 rejects the current measurements if the residuals of range and velocity from the process 50 exceed thresholds that are adaptively computed in the process 51 in response to the computed estimated time, position, velocity and acceleration for an HTU 11 from the process 58.

If the current weighted measurements are accepted in the process 51, a process 55 updates the current state vector estimate by combining the accepted weighted measurements with geographic aiding from a process 56. The geographic aiding provided by the process 56 takes into account the known elevation of the track and a possible range of motion for the HTU 11 since the last measurement. The updated estimate is provided to a function 54, which updates an error covariance.

The updated estimate and the updated covariance are provided to a function 57, which projects the estimate and covariance to the next measurement time. The projected estimate and covariance are further responsive to an adaptive motion process noise provided by a function 61 based on the estimated time, position, velocity and acceleration computed by the function 58.

As briefly discussed above, a database 60 stores track specific information that is used to adaptively modify the weighting in the function 53, pseudorange and delta pseudorange corrections in the function 48, the Kalman filter parameters in the function 51, and the geographic aiding provided by the function 56.

The track specific information stored in the database 60 includes racetrack reference timing lines and the geometry and composition of structures around the track. The track specific information in the database 60 is also used in a function 59 to compute continuous real-time data that is displayed to the users during the race as represented by a display 62. The displayed real-time data computed in the function 59 includes, but is not limited to derived metrics, such as, for example, the race position for each horse (e.g., whether the horse is in first place, second place, or the like, in the field of horses), the time for each horse to traverse each ⅛ mile length of the track, and the position, velocity and acceleration of each horse in a track coordinate system. The track coordinate system identifies the location of each horse with respect to a distance along the track (e.g., the distance traveled in the direction of forward movement of the horse from the beginning of the race) and with respect to a cross track position (e.g., a lateral position with respect to the inside rail of the track). The data for each horse may also be displayed with respect to a Cartesian coordinate system referenced to a selected origin (e.g., the starting location of the race or a known fixed location).

As further illustrated in FIG. 3, the navigation data received by the reference receiver 12 is used to generate satellite clock and ephemeris data in a function 42. The satellite clock and ephemeris data are provided to the function 46 for use in calculating the satellite positions for each of the HTUs 11. The satellite clock and ephemeris data are also provided to a function 40, which periodically initializes the HTUs 11 by transmitting commands to the HTUs 11 via the communications link 39.

FIG. 4 illustrates the operation of the system. As discussed above, in a step 71, an individual tracking unit (HTUs 11) is placed on each horse prior to a race. In a step 72, the tracking units are then initialized for several minutes prior to a race via the function 40 in FIG. 3. The receivers within each tracking unit receive almanac and ephemeris data from the satellite data message to enable the receivers to quickly establish tracking of the currently visible satellites. Prior to the start of a race, the tracking units are then periodically pinged (e.g., polled via the communications link 39) in a step 73 to obtain the respective health status and the operating condition of each unit. In a step 74, the race system controller 15 determines whether all the tracking units have responded with acceptable health status and operating condition indications. If any tracking unit does not respond or responds with an unacceptable health status indication, the race operator is notified in a step 80 so that the unit may be replaced with a properly functioning tracking unit. Thereafter, the initialization process is continued until all tracking units are determined to be operating properly in the step 74.

When all tracking units are determined to be operating properly in the step 74, the race can started in a conventional manner. When the race starts and the horses leave the starting gate, the system operation begins to collect data in real-time. In particular, as illustrated by a step 75, the tracking units provide data to the system continuously. As discussed above, "continuously" means that the tracking units provide output data periodically throughout the race. Preferably, the output data is provided at a rate greater than 1 Hz (e.g., 2-10 Hz). In one embodiment, the output data is provided at a rate of 4 Hz. As illustrated by a step 76, the data from all tracking units are collected by the race system controller 15 (FIG. 1). In a step 77, the data for each horse is processed by the race data processor 17 (FIG. 1), and a navigation solution is computed for each horse. Then, in step 78, the basic data for each horse (e.g., the position within the field of horses, the position of the horse on the track position, the velocity of the horse, and the like) are derived and displayed in real time until the race is completed. After each race is concluded, the tracking units are removed from the horses (or from the jockeys) and turned off in a step 79 to conserve batteries until the next race.

FIG. 5 illustrates an operational use flow diagram for the system. A function 81 provides the real time position and velocity data calculated for each horse tracking unit to a function 82 and to a function 83. The function 82 uses the data to compute position, speed, acceleration and time for each horse. The function 83 uses the data from the function 81 and the computed data from the function 82 to calculate derived data having special uses for the racing industry and customers of the racing industry. For example, the derived data for each horse can include distance behind the lead horse and lost ground at various locations in a race and other similar metrics that could not be readily generated without the continuous data collecting and processing capability of the present system. The computed data from the function 82 and the derived data from the function 83 are advantageously provided via the Internet, via PDA interfaces and via cell phone interfaces as inputs to one or more of comparative analysis tools 84, as inputs to simulations 85, as real-time race data streams 86, and as data for a real-time wagering system 87. In addition, the computed data and the derived data can be provided as inputs to race training and workout performance analysis tools 88. For example, the comparative analysis tools 84 advantageously compare horse racing profiles produced from the data for a current race to historical or workout profiles for a horse in order to update the profiles for the horse. The data from previous races by the horses entered in an upcoming race may also be used to produce a pre-race simulation for the upcoming race. A post-race simulation of a race may be used to fine tune racing predictions and to provide handicapping data. By providing real-time displays of the current positions of horses on a track and the relative positions of the horses in the racing field, the Internet-based, PDA-based or cell phone-based systems enables unique wagering applications, such as, for example, the ability to wager on fractions of races (e.g., wagers on which horse reaches the quarter-mile marker, the half-mile marker, or the like). The data used to determine the outcome are based on actual measurements rather than the possibly subject determination of a chart caller. The measured data displayed to the users and track officials to verify the winners and the positions of the horses at selected locations during the race. The measurement of the data on a real-time basis allows a user to update a wager if a horse performs better than predicted at the beginning the race (e.g., out of the gate). The wagers may be updated automatically based on parameters established by a particular user.

FIG. 6 illustrates a diagram of the Kalman filter process performed in the function 50 in FIG. 3 for a particular HTU 11 for each periodic update of the position of the respective HTU. In an initialization block 89, a state vector $\hat{x}_k$ and the error covariance $P_k$ used in the Kalman filter process is initialized during step k=0. One particularly advantageous aspect of the Kalman filter process used herein is that in the initialization block 89, the state vector is tailored to the unique dynamics of an object (e.g., a horse) racing on a fixed path track in a horizontal plane. In particular, the state vector $\hat{x}_k$ is initialized as:

$$\hat{x}_k = [x \ y \ z \ v_a \ v_v \ \theta \ a_a \ a_v \ r \ dt \ df]$$

where:
x is the position in the x dimension in track Cartesian coordinates;
y is the position in the y dimension in track Cartesian coordinates;
z is the position in the z dimension (altitude) in track Cartesian coordinates;
$v_a$ is the velocity along the track;
$v_v$ is the vertical velocity (which is usually 0 on an exemplary racetrack);
$\theta$ is the heading angle with respect to true north;
$a_a$ is the acceleration along the track;
$a_v$ is the vertical acceleration (which is usually 0 on an exemplary racetrack);
r is the radius of a turn;
dt is the clock offset error; and
df is the clock frequency error.

After the state vector and the covariance are initialized in the block 89 is completed, the Kalman filter gain $K_k$ matrix having entries for each of the satellites visible to the receiver in the HTU 11 is computed in a block 90 as:

$$K_k = P_k^- H_k^T (H_k P_k^- H_k^T + R_k)^{-1}$$

where:
$P_k^-$ is the error covariance at time step k as initialized or as determined in previous iterations of the Kalman filter process;
$H_k$ is the matrix of line of sight unit vectors for each of the satellites visible to the receiver at time step k; and
$H_k^T$ is the transpose of the matrix of line of sight unit vectors at time step k;
$R_k$ is the adaptively modified noise measurement matrix for time step k calculated in a block 90a.

In the block 90a, the values for the $j^{th}$ satellite in the adaptively modified measurement noise variance matrix $R_k$ is calculated as:

$$R_{k,j} = R_f(CNo_j, \text{lat, lon}, az_j, el_j)$$

where:
Rf is the matrix of measurement noise variances as a function of the variables in the parentheses;
$CNo_j$ is the measured carrier to noise ratio for the $j^{th}$ satellite as measured by the receiver in the HTU 11;
lat is the latitude of the HTU 11 as initialized or as determined in previous iterations of the Kalman filter process;
lon is the longitude of the HTU 11 as initialized or as determined in previous iterations of the Kalman filter process;
$az_j$ is the azimuth of the $j^{th}$ satellite; and $el_j$ is the elevation of the $j^{th}$ satellite.

In the block 90a, the measurement noise is adaptively modified on a satellite by satellite basis based on the status of the code and carrier loops, and based on the position of the tracking unit on the track. The position of the tracking unit on the track includes information based on the satellite line of sight and data representing the physical layout of the track (e.g., the positions and sizes of structures, trees etc.).

After computing the values for the Kalman filter gain matrix in the block 90, the state vector $\hat{x}_k$ for each satellite j is updated with corrected measurements in a block 91 as:

$$\hat{x}_k = x_k^- + K_k(z_k - H_k \hat{x}_k^-)$$

where:
$\hat{x}_k^-$ is the previous state vector for time step k; and
$z_k$ is the corrected measurement vector calculated in a block 91a.

In the block 91a, $z_{k,j}$ is calculated for the $j^{th}$ satellite as:

$$z_{k,j} = Z_k + D_k + Z_f(\text{lat, lon}, az_j, el_j)$$

where:
$Z_k$ is raw measurement vector;
$D_k$ is differential correction vector;
Zf is the additional measurement correction vector as a function of the variables within the parentheses; and
lat, lon, $az_j$, and $el_j$ are the latitude, longitude, azimuth and elevation parameters for the $j^{th}$ satellite described above with respect to the block 90a.

After updating the estimate in the block 91, the error covariance $P_k$ is updated in a block 92 as:

$$P_k = (I - K_k H_k) P_k^-$$

where:
I is identity matrix; and
$K_k$, $P_k^-$ and $H_k$ and are the parameters described above with respect to the blocks 90 and 91.

The updated state vector $\hat{x}_k$ determined in the block 91 and the updated covariance $P_k$ determined in the block 92 are projected ahead in a block 93 to be used in computing the Kalman filter gain during the next iteration as:

$$\hat{x}_{k+1} = \phi_k \hat{x}_k$$

$$P_{k+1} = \phi_k P_k \phi_k^T + \beta Q_k \beta^T$$

where:
- $\hat{x}_{k+1}$ is the projected state vector (to time step k+1);
- $\phi_k$ is transition matrix at time step k;
- $P_{k+1}$ is the projected covariance (to time step k+1);
- $\phi_k^T$ is transpose of the transition matrix at time step k;
- $\beta$ is a rotation matrix that converts along track and cross track coordinates into earth centered, earth fixed (ecef) Cartesian coordinates;
- $Q_k$ is an adaptively modified process noise value calculated in a block 93a; and
- $\beta^T$ is the transpose of the rotation matrix $\beta$.

The adaptively modified process noise value $Q_k$ is calculated in the block 93a as:

$$Q_k = Q_f(t, \text{lat}, \text{lon})$$

where:
- $Q_f$ is process noise as a function of the variable within the parenthesis;
- t is the time since the start of the current race; and
- lat and lon are the latitude and longitude parameters described above with respect to the block 90a.

Another particularly advantageous aspect of the Kalman filter process implemented herein is that the process noise model 93a takes into account the physical dynamics of ground based moving objects (e.g., horses) confined to motion in a plane, where the possible position of each moving object is constrained by the dimensions of the track, and where the velocity and the acceleration are also limited by the physical properties of the moving object.

FIG. 7 pictorially illustrates how the Kalman filter process noise is adapted based on the location of the horse on the track and based on the time into the race. An oval 94 represents a layout of a typical racetrack. A line 95 begins at a "start" location and continues around the oval 94 counterclockwise until the line concludes at approximately the midpoint of the lower portion of the oval. The width of the line 95 at each location from the start and around the oval represents the magnitude of the process noise at the respective location. As illustrated by the changing width of the line 95, the process noise begins to increase after the start of the race but remains relatively small during the initial straight section of the race at the bottom of the diagram, at the second straight stretch at the top of the diagram, and again at the final straight stretch before the end of the race. The process noise is greater in each of the turns as the horses accelerate to keep close to the rail.

FIG. 8 illustrates the geographic aiding and the diffraction/refraction/reflection corrections implemented in the present invention. The elevation profile of a particular racetrack can be surveyed very accurately and generally does not change over time. Accordingly, the elevation profile of the racetrack is advantageously provided as a pseudo-measurement input to the geographic aiding function 56 (FIG. 3) in a similar manner as a satellite measurement. In FIG. 8, a horse 96 carries a GNSS receiver (not shown) either directly or via a rider (not shown) on the horse. The GNSS receiver receives signals from a GNSS satellite and the received signals are used to generate pseudorange and delta pseudorange measurements, as discussed above. A number of effects can cause errors in the pseudorange and delta pseudorange measurements. For example, a multipath signal 98 may be caused by reflection of the signal off a solid object 97 near the track before the signal reaches the GNSS receiver. The reflected multipath signal 98 distorts the correlation peak in the GNSS receiver and may cause the measurements to be too small or too large. The use of a high sensitivity receiver introduces problems that are normally not encountered by conventional GNSS receivers. Since the high sensitivity receiver is able to track signals many orders of magnitude smaller than normally encountered in the processing of GNSS signals, the high sensitivity receiver may also track a signal 99 that has been diffracted around the object 97, a signal 100 that is refracted as it passes through the object 97 or a signal 101 that is attenuated by the object 97. This is further complicated by the presence of multiple objects and by different effects on signals from multiple satellites at different positions with respect to the receiver and the objects. The track database 60 (FIG. 3) includes information regarding the locations, geometries, and compositions of objects proximate a racetrack and includes further information obtained from signal propagation tests taken at the racetrack. The information in the database 60 enables the system described herein to correct for the effects of the objects in the Kalman filter rather than simply de-weighting the affected signals. The system uniquely applies ray-tracing algorithms to information in the racetrack database 60 in combination with the position of the HTU and the satellite location to determine the cause of the position and timing errors associated with the low power signals and to correct the errors. Simple attenuation such as signal 101 does not need correction since the signal is not delayed. Multipath (signal 98) is reduced by using an antenna that attenuates left hand circular polarized signals, narrow correlation technology and carrier smoothing, and the like.

To correct for diffraction errors (signal 99), the following value is subtracted from the pseudorange signal affected by the diffracting object:

$$\text{Diff\_pr} = \sqrt{h^2 + l^2} - l/\cos(\theta)$$

where:
- h=height difference to the diffracting object; and
- l=distance from the diffracting object.

To correct for refraction errors (signal 100), the following value is subtracted from the pseudorange value of a signal affected by a refracting plates on an object causing refraction:

$$\text{Ref\_pr} = d/\cos(\theta_2) * (n_2 - \cos(\theta_1 - \theta_2))$$

where:
- $\theta_2 = \sin^{-1}(n_2 * \sin(\theta_1))$
- $n_2$=index of refraction of the plate refracting the signal
- d=thickness of the refracting plate.
- $\theta_1$=angle of incidence of the signal onto the refracting plate.

One skilled in art will appreciate that the foregoing embodiments are illustrative of the present invention. The present invention can be advantageously incorporated into alternative embodiments while remaining within the spirit and scope of the present invention, as defined by the appended claims.

We claim:

1. A system for continuous and precise tracking and timing of a plurality of moving objects at a rate of at least 1 Hz over a known course comprising:

a plurality of portable tracking units, each portable tracking unit mounted on and moving with a respective object traveling over a known course, each portable tracking unit comprising:
- a global navigation satellite system (GNSS) receiver having a plurality of channels for receiving signals from a plurality of GNSS satellites, each channel comprising a plurality of correlators sufficient to enable the receiver to track a satellite signal when the received power level of the signal is at least as low as −154 dBm, the receiver continuously generating pseudorange values, delta pseudorange values and signal quality values at a predetermined rate of at least 1 Hz for each satellite signal being received by the receiver; and
- a mobile communication link that transmits output signals representing the pseudorange values, delta pseudorange values and signal quality values generated by the receiver;

a reference station located in a known fixed position with respect to the known course, the reference station including a reference GNSS receiver having a plurality of channels for receiving signals from a plurality of GNSS satellites, the reference GNSS receiver generating pseudorange values, delta pseudorange values and signal quality values at a predetermined rate of at least 1 Hz for each satellite signal being received by the reference GNSS receiver, the reference station transmitting output signals representing the pseudorange values, delta pseudorange values and signal quality values generated by the reference GNSS receiver;

a race data processor that receives data from the portable tracking units and from the reference station representing the pseudorange values, delta pseudorange values and signal quality values for each satellite signal received by the receiver in each portable tracking unit and for each satellite signal received by the reference GNSS receiver, the race data processor responsive to the data from each portable tracking unit, the data from the reference GNSS receiver, and signal propagation characteristics of the known course to compute an individual GNSS position and timing solution for each portable tracking unit when the GNSS processing system receives the signal data; and a race systems controller that provides position and movement data for each portable tracking unit based on the GNSS solution for the tracking unit.

2. The system as defined in claim 1, wherein each channel of the GNSS receiver in each tracking unit includes code tracking and carrier tracking loops.

3. The system as defined in claim 1, wherein each channel of each GNSS receiver in each portable tracking unit has a coherent integration duration of at least 20 milliseconds.

4. The system as defined in claim 1, wherein the plurality of channels comprises at least 12 channels, and wherein the plurality of satellites ranges from 3 satellites to at least 12 satellites.

5. The system as defined in claim 1, wherein the plurality of correlators in each GNSS receiver in each tracking unit comprises at least 30,000 equivalent correlators.

6. The system as defined in claim 1, wherein each portable tracking unit transmits output data at a rate greater than 1200 bits per second per tracking unit.

7. The system as defined in claim 1, wherein the moving objects are horses, and wherein the known course is a racetrack.

8. A method for tracking moving objects in a competition over a known course, comprising:
- placing and activating a portable tracking device on each object in the competition, each tracking device positioned on the respective object to receive signals from a plurality of satellites in a global navigation satellite system (GNSS);
- collecting GNSS pseudorange and delta pseudorange measurements and satellite almanac and ephemeris data from a reference station in a known, fixed location;
- transmitting GNSS pseudorange and delta pseudorange measurements and signal quality information for each satellite being tracked by each portable tracking device to a central location before and during the competition;
- transmitting GNSS pseudorange and delta pseudorange measurements and signal quality information for each satellite being tracked by the reference station to the central processing location before and during the competition; and
- continually determining an actual position of each object at a rate of at least 1 Hz based on the GNSS pseudorange and delta pseudorange measurements and signal quality information received from the portable tracking unit on the object, based on the GNSS pseudorange and delta pseudorange measurements and signal quality information received from the reference station, and based on signal propagation characteristics of the known course until the conclusion of the competition.

9. The method as defined in claim 8, further comprising analyzing the measurements and signal quality information received from each portable tracking device to determine whether the portable tracking device operating properly.

10. The method as defined in claim 9, further comprising verifying that the portable tracking devices on all objects in a competition are operating properly before starting the competition.

11. The method as defined in claim 8, further comprising displaying the actual position information for each object in real time during the competition.

12. The method as defined in claim 11, further comprising displaying the relative position of each object with respect to other objects in the competition during the competition.

13. The method as defined in claim 11, wherein displaying the actual position information for each object comprises displaying the actual position in a track coordinate system that includes at least a distance along the known course from the beginning of the competition and a distance with respect to a lateral boundary of the known course.

14. The method as defined in claim 11, wherein displaying the actual position information for each object comprises displaying the actual position as a location in a Cartesian coordinate system referenced to a selected origin.

15. The method as defined in claim 11, further comprising deriving and displaying a set of competition metrics for each object in the competition, the set of competition metrics comprising:
- identification of the object as a lead object if the object is the lead object or is sharing the lead with another object; and
- if the object is not identified as the lead object:
- a relative distance of the object behind the lead object in the competition;
- a relative speed of the object with respect to the lead object;
- displaying an amount of time that the object lags behind the lead object;
- a change in the relative distance between the object and the lead object; and an acceleration of the object with respect to at least the lead object.

16. The method as defined in claim 8, further comprising transferring the actual position information for each object during the competition to a central database for storage.

17. The method as defined in claim 16, wherein the actual position information stored for each object includes:
   a start time for the competition;
   at least one time relative to the start time when the object passes at least one predetermined location in the known course;
   locations of the object at predetermined timing and position intervals during the competition; and
   an ending time when the object completes the competition.

18. The method as defined in claim 8, further comprising providing the position or timing information for each object as current information to a plurality of users via a network.

19. The method as defined in claim 8, further comprising analyzing the position information for each object to determine current performance information for the object and comparing the current performance information to historical performance information for the object.

20. The method as defined in claim 19, further comprising simulating the expected performances for the objects in a competition based on previous performance information for the objects determined from the position data collected during other competitions.

21. The method as defined in claim 20, further comprising simulating the performance of at least one object in a previous competition based at least in part on position information collected in the current competition to analyze changes in the performance of the object.

22. The method as defined in claim 8, further comprising providing position data for each object in a competition to a plurality of users during the competition to enable the users to determine the relative positions of the objects at predetermined locations along the known course competition in addition to the relative positions of the objects at the end of the known course.

23. The method as defined in claim 8, further comprising enabling the plurality of users to enter additional wagers during a competition based on relative positions of objects at predetermined locations towards the beginning of the competition.

24. The method as defined in claim 8, further comprising enabling users to wager on the relative positions of the objects when the objects reach predetermined locations in the competition other than the conclusion of the competition.

25. The method as defined in claim 8, further comprising initializing each portable tracking device with current satellite almanac and ephemeris data collected from the reference station to enable each portable tracking device to acquire and track signals from the plurality of GNSS satellites for a predetermined time before the beginning of the competition.

26. A method for acquiring, collecting, processing, and tracking at least one object moving along a predetermined course, comprising:
   receiving global navigation satellite system (GNSS) signals from a plurality of satellites in view of a moving receiver mounted on the at least one moving object while the object moves from a starting location to an ending location along the predetermined course;
   continually generating GNSS measurement data at a rate of at least 1 Hz in response to the GNSS signals received by the moving receiver;
   receiving GNSS signals from a plurality of satellites by a reference receiver in a known location;
   continually generating GNSS measurement data at a rate of at least 1 Hz in response to the GNSS signals received by the reference receiver;
   transmitting the GNSS data from the moving receiver to a processing station;
   transmitting the GNSS data from the reference receiver to the processing station;
   processing the GNSS data from the moving receiver to calculate an estimated line of sight distance from the moving receiver to each of the satellites in view of the moving receiver;
   computing differential corrections for each of the calculated line of sight distances using the GNSS data from the reference receiver and applying the differential corrections to the calculated line of sight distances to generate a corrected line of sight distance to each of the satellites in view of the moving receiver;
   applying an adaptive criteria to each of the corrected line of sight distances to adaptively reject unacceptable measurements and to pass acceptable measurements based in part on known signal propagation characteristics of the predetermined course;
   generating an updated line of sight distance from the moving receiver to each satellite for which the respective adaptive criteria pass an acceptable measurement; and
   calculating a location of the moving receiver based on the updated line of sight distances.

27. The method as defined in claim 26, wherein:
   the GNSS data generated by the moving receiver comprises pseudorange values for each satellite in view of the moving receiver, delta pseudorange values for each satellite in view of the moving receiver, carrier tracking loop status information for each satellite in view of the moving receiver, and tracking quality parameters for each satellite in view of the moving receiver; and
   the GNSS data generated by the reference receiver comprises pseudorange values for each satellite in view of the reference receiver, delta pseudorange values for each satellite in view of the reference receiver, carrier tracking loop status information for each satellite in view of the reference receiver, and tracking quality parameters for each satellite in view of the reference receiver.

28. The method as defined in claim 26, wherein applying the adaptive criteria to each corrected line of sight distance to each satellite comprises:
   computing an optimal Kalman filter gain responsive to the carrier signal to noise ratio data for the signal from the respective satellite, the estimated elevation to the respective satellite, and carrier loop status information;
   computing a state vector that employs estimates of the position, velocity and acceleration of the moving object, a receiver clock offset with respect to the satellite clock, and a clock frequency error for the signal from the respective satellite;
   updating a Kalman filter state vector responsive to a current pseudorange value and a current delta pseudorange value from the respective satellite and responsive to geographic aiding data representing the signal propagation characteristics of the predetermined course;
   updating a covariance matrix with longitudinal course and lateral course components that adaptively change based on a velocity vector of the moving object and a position of the moving object on the predetermined course;
   estimating the position, velocity, and acceleration of the moving object along with virtual timing reference lines to compute a time at which the moving object crosses the timing reference lines;

estimating a position, velocity and acceleration of the moving object and a covariance to project to the next measurement time when the process repeats; and repeating the foregoing steps for as new data are received periodically.

29. The method as defined in claim 26, further comprising:

generating a satellite clock and ephemeris data by the reference receiver; and transmitting the satellite clock and ephemeris data to the moving receiver to initialize the moving receiver prior to the object moving from the starting location.

30. A method for acquiring, collecting, processing, and tracking at least one object moving along a predetermined course, comprising:

receiving global navigation satellite system (GNSS) signals from a plurality of satellites in view of a moving receiver mounted on the at least one moving object while the object moves from a starting location to an ending location along the predetermined course;

continually generating GNSS data at a rate of at least 1 Hz in response to the GNSS signals received by the moving receiver;

receiving GNSS signals from a plurality of satellites by a reference receiver in a known location;

continually generating GNSS data at a rate of at least 1 Hz in response to the GNSS signals received by the reference receiver;

processing the GNSS data from the moving receiver to calculate an estimated line of sight distance from the moving receiver to each of the satellites in view of the moving receiver;

computing differential corrections for each of the calculated line of sight distances using the GNSS data from the reference receiver and applying the differential corrections to the calculated line of sight distances to generate a corrected line of sight distance to each of the satellites in view of the moving receiver;

applying an adaptive criteria to each of the corrected line of sight distances to adaptively reject unacceptable measurements and to pass acceptable measurements based in part on known signal propagation characteristics of the predetermined course;

generating an updated line of sight distance from the moving receiver to each satellite for which the respective adaptive criteria pass an acceptable measurement; and calculating a location of the moving receiver based on the updated line of sight distances.

31. The method as defined in claim 30, wherein:

the GNSS data generated by the moving receiver comprises pseudorange values for each satellite in view of the moving receiver, delta pseudorange values for each satellite in view of the moving receiver, carrier tracking loop status information for each satellite in view of the moving receiver, and tracking quality parameters for each satellite in view of the moving receiver;

the GNSS data generated by the reference receiver comprises pseudorange values for each satellite in view of the reference receiver, delta pseudorange values for each satellite in view of the reference receiver, carrier tracking loop status information for each satellite in view of the reference receiver, and tracking quality parameters for each satellite in view of the reference receiver; and the signal propagation characteristics of the predetermined course include locations of objects proximate to the predetermine course and parametric information sufficient to calculate multipath, diffractive and refractive effects of the objects on signals from satellites.

32. A method of obtaining and displaying a set of competition metrics for a plurality of animals racing over a known course, comprising:

continually obtaining accurate position data for each of the animals at a rate of at least 1 Hz, the accurate position data based on global network satellite system (GNSS) data received by a respective GNSS receiver mounted on each animal, the GNSS data for each animal adaptively corrected in accordance with the position of each animal on the known course in accordance with satellite signal propagation characteristics affected by known objects proximate to the known course;

generating a set of competition metrics for each animal based on the accurate position date for the animal, the set of competition metrics comprising:

the current numeric position of the animal in the competition;

a distance of the animal laterally with respect to an inner boundary of the predetermined course; and for any animal that is trailing at least one leading animal, the competition metrics further comprising:

a relative distance of the animal behind the leading animal;

a relative speed of the animal with respect to the leading animal;

an amount of time that the animal lags behind the leading animal; and an acceleration of the animal with respect to at least the leading animal.

33. The method as defined in claim 32, wherein the competition metrics for each animal further includes:

a start time for the competition;

at least one time relative to the start time when the animal passes at least one predetermined location in the known course;

locations of the animal at predetermined timing intervals during the competition; and an ending time when the animal completes the competition.

* * * * *